United States Patent Office 3,066,885
Patented Dec. 4, 1962

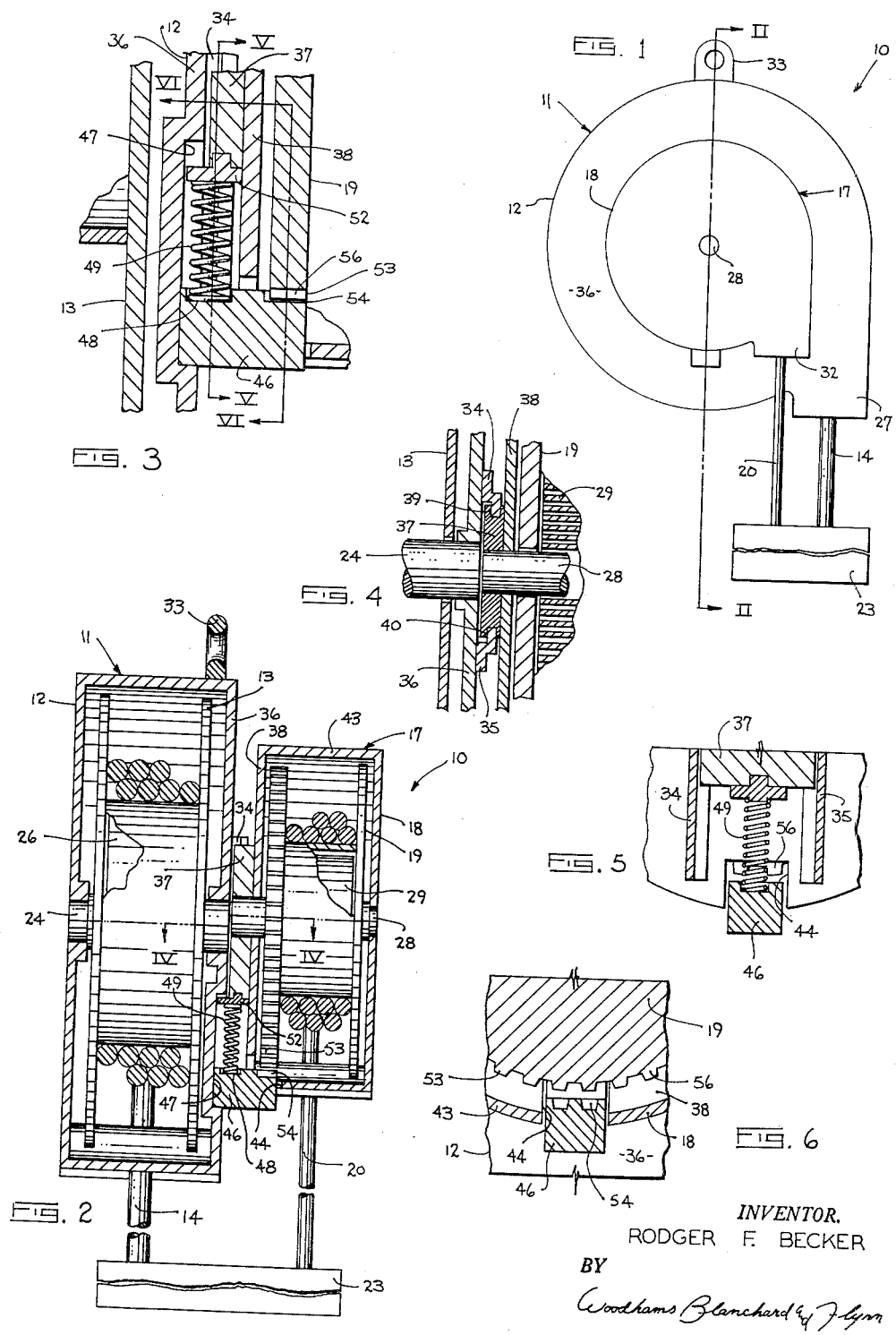

3,066,885
CORD REEL WITH SECONDARY LOAD SUPPORT
Rodger F. Becker, Kalamazoo, Mich., assignor to Aero-Motive Manufacturing Company, Kalamazoo, Mich., a corporation of Michigan
Filed Jan. 4, 1960, Ser. No. 89
9 Claims. (Cl. 242—107.4)

This invention relates in general to a cord reel and, more particularly, to a cord reel assembly including a primary reel connectable to a load and a secondary reel mounted upon the primary reel and arranged to support the load if and when any failure occurs in the load supporting function of the primary reel.

It has become common practice to suspend relatively large and heavy loads by the cord of a spring biased cord reel so that the load is balanced by the tension of the spring and, therefore, the load can be manually and easily moved upwardly or downwardly from one position to another. Such a reel, which is sometimes referred to as a balance reel, has a cord supporting drum equipped with a rewind spring which is strong enough to support the load. In some cases, a drag mechanism is applied to the drum for the purpose of retarding or controlling the rewind velocity of the drum due to the drum spring, or for the purpose of preventing downward creeping of the cord from the drum in response to the weight of the load thereon. In existing cord reels of this type and for these purposes, a mechanical failure involving the load supporting cord, the drum, the drum spring or any other part whereby the cord is either directly or indirectly connected to the drum casing, will normally result in an immediate and rapid downward movement of the load under the force of gravity.

Because certain parts of cord reels, such as the cord or spring, are known to wear or fatigue and thereafter break or release the load, the use of cord reels as balance reels has been restricted. For example, it has not been considered advisable to use balance reels for the support of heavy objects suspended above humans for the obvious reason that they could be seriously injured if a failure of the reel should occur. Some attempts have been made to reduce the circumstances which might result in an accidental downward movement of the load supported by a cord reel. However, insofar as I am aware, none of these attempts has been completely successful for at least two very important reasons. First, only a prolonged downward movement of the load can be arrested by existing devices and only then if the failure occurs in the drum or the drum supporting mechanism. Often, even a relatively small amount of accidental downward movement, such as two or three inches, may be sufficient to result in irreparable damage or injury to the load or to that which is directly below it. However, if the failure occurs in the cord or cable, itself, existing cord reel assemblies have no provision whatsoever for stopping the downward movement of the load.

Accordingly, a primary object of this invention has been the provision of a cord reel assembly including a safety device for positively preventing the accidental release, or uncontrolled downward movement, of a load supported thereby and, more particularly, a balance reel assembly having primary and secondary cord reels connected together and supported for suspending a load to which the cords of both reels are attached.

A further object of this invention is the provision of a cord reel assembly, as aforesaid, wherein the primary reel provides the normal support for the load and the secondary reel provides a load support when, but only when, a failure occurs in the primary reel whereby the load is unintentionally permitted to move downwardly under the force of gravity.

A further object of this invention is the provision of a cord reel assembly, as aforesaid, which is equipped with an automatic safety device for preventing accidental downward movement of the load supported by the assembly, which movement would normally occur if there is a failure in the cord or any parts of the reel which connect the load supporting cord to the cord reel casing.

A further object of this invention is the provision of a cord reel assembly, as aforesaid, which is simple in its operation, which requires little or no maintenance, which can be easily and quickly installed and which is capable of supporting a load as easily and effectively as any existing cord reel for the same or similar purposes, including those without any safety device thereon.

A further object of this invention has been the provision of a cord reel assembly, as aforesaid, including a primary load supporting reel and a secondary safety support reel, which safety support reel can be mounted upon and combined with existing types of cord reels without materially changing the construction and/or operation of such cord reels.

Other objects and purposes of this invention will become apparent to persons familiar with this type of equipment upon reading the following specification and examining the accompanying drawings, in which:

FIGURE 1 is a side elevational view of a cord reel assembly embodying the invention.

FIGURE 2 is a sectional view substantially as taken along the line II—II in FIGURE 1 with the cord reel drums shown in broken, side elevation.

FIGURE 3 is an enlarged fragment of FIGURE 2 showing parts thereof in a different position of operation.

FIGURE 4 is a sectional view taken along the line IV—IV in FIGURE 2.

FIGURE 5 is a sectional view substantially as taken along the line V—V in FIGURE 3 with the parts thereof arranged as appearing in FIGURE 2.

FIGURE 6 is a sectional view substantially as taken along the line VI—VI in FIGURE 3 with the parts thereof arranged as appearing in FIGURE 2.

For convenience in description the terms "upper," "lower," derivatives thereof and words of similar import will have reference to the reel assembly of the invention as appearing in FIGURES 1 and 2. The terms "inner," "outer," derivatives thereof and words of similar import will have reference to the geometric center of said reel assembly and said parts thereof.

*General Description*

The objects and purposes of the invention, including those set forth above, have been met by providing a cord reel assembly comprised of a primary cord reel and a secondary cord reel mounted upon the casing of the primary cord reel, both having drum supported cords which are secured to the load. The load is normally supported by the primary cord reel which has a spring biased drum, the spring tension of which is adjusted so that the load can be manually moved upwardly or downwardly by a force which is relatively small by comparison to the weight of the load being supported. The casing of the secondary reel is slidably supported upon the casing of the primary reel for vertical movement. Resilient means mounted upon and between the casings of the primary and secondary reels resiliently resists downward movement of the secondary reel casing with respect to the primary reel casing and prevents such movement when the load is raised or lowered relatively slowly. However, an abrupt downward movement of the load, hence of cord from the secondary reel, will cause a downward movement of the secondary casing with respect to the primary casing. The casing of the primary reel and the casing of the secondary reel have engageable means which become engaged when the secondary reel is moved downwardly with respect to the primary reel, thereby locking the drum of the secondary reel against rotation with respect to its casing and that of the primary reel.

Accordingly, if a failure occurs in the primary reel whereby the load which it supports is permitted to drop, such abrupt movement will effect the downward movement of the secondary reel casing whereby the drum therein will be prevented from rotating, thereby positively preventing the load from dropping as it otherwise would.

Detailed Construction

The reel assembly 10 (FIGURES 1 and 2), which has been selected to illustrate a preferred embodiment of the invention, is comprised of a primary reel 11 including a primary casing 12 and a primary drum 13 rotatably mounted within the casing 12 and supporting a primary cord or cable 14. The reel assembly 10 also includes a secondary reel 17 having a secondary casing 18 and a secondary drum 19 rotatably supported within the casing 18 and having a secondary cord 20 secured thereto. The cords 14 and 20 may be connected to a load 23 in any convenient manner.

The primary drum 13 (FIGURE 2) is rotatably supported upon a shaft 24 and is connected thereto by a coil spring 26 in a conventional manner. Drag means, not shown, may be provided also in a conventional manner for retarding or controlling the rotational velocity of the drum during its unwinding or rewinding movement. The primary cord 14 extends downwardly through the cord guide 27 in the periphery of the primary casing 12.

The drum 19 (FIGURE 2) of the secondary reel 17 is rotatably supported upon the shaft 28 and is connected thereto by means of the coiled secondary spring 29 which resiliently opposes the unwinding rotation of said drum 19. The secondary cord 20 extends downwardly through the secondary cord guide 32 which is located in the periphery of the secondary casing 18.

The primary casing 12 (FIGURE 1) has an upwardly projecting support lug 33 whereby the entire reel assembly 10 may be suspended. The primary casing 12 (FIGURE 2) also has a pair of spaced parallel and substantially vertical slide guides 34 and 35 (FIGURE 4) which are secured to the sidewall 36 and are preferably disposed upon diametrically opposite sides of the primary shaft 24. An elongated slider 37 is secured to the adjacent side 38 of the secondary casing 18 and has a pair of parallel, vertical grooves 39 and 40 extending along the opposite edges of said slider into which the opposing edges of the slide guides 34 and 35, respectively, are snugly and vertically slidably received. Accordingly, the secondary casing 18 is mounted upon the primary casing 12 for vertical movement lengthwise of the guides 34 and 35.

The secondary casing 18 (FIGURES 3 and 6) has in the lower edge of its side 38 and the lower portion of its circumferential wall 43 an opening 44. A stop member 46 is mounted upon the side 36 of the primary casing 12 within the lower end of the vertically elongated recess 47 in said side wall 36. Said stop member 46 is slidably extendable through the opening 44 into the interior of the secondary casing 18. The upper surface of the stop member 46 has adjacent to the primary casing 12 a small cavity 48 into which the lower end of a spiral spring 49 is snugly received. The upper end of the spiral spring 49 is engaged by a guide plate 52 which is removably secured to the lower end of the slider 37. The spring 49 is held under compression between the stop member 46 and guide plate 52 whereby downward movement of the secondary casing 18 with respect to the primary casing 12 is positively, but resiliently opposed.

Gripping means, such as the gear 53 (FIGURE 2) is coaxially mounted upon the secondary drum 19 adjacent to the side wall 38 of casing 18 and preferably extends radially outwardly from one rim thereof. The stop member 46 contains teeth 54 which are radially aligned with and engageable by the teeth 56 on the gear 53. Under normal conditions, the gear teeth 56 are spaced from the teeth 54 on the stop member 46 just far enough to permit the secondary drum 19 to rotate freely upon the shaft 28. Moreover, the force required to compress the spring 49 will normally be greater than the force required to overcome tension in the secondary spring 29 when the cord 20 is unwound from the secondary drum 19.

Operation

The load 23 is connected to both the primary and secondary cords 14 and 20, respectively, so that both the primary and secondary drums 13 and 19, respectively, will be rotated each time the load 23 is raised or lowered. However, the weight of the load 23 will normally be supported almost entirely by the primary cord 14 and, therefore, its downward movement will be opposed substantially entirely by the primary spring 26. Although the secondary spring 29 may be adjusted so that it too will counteract some of the force of gravity on the load 23, said secondary spring 29 will normally be only of such strength as is required to retract the weight of the secondary cord 20. Accordingly, when the load 23 is moved upwardly or downwardly at a normal rate, the secondary drum 19 will rotate freely upon the shaft 28 in the appropriate direction without any interference from and between the gear 53 and the stop member 46.

The tension of the spring 49 is such that a sudden downward movement or an abrupt acceleration in the downward movement of the secondary cord 20 will cause the secondary reel 17 as well as the secondary casing 18 to move downwardly with respect to the primary casing 12. That is, the inertia of the secondary drum 19 and the parts associated therewith will oppose a sudden rotational acceleration of the drum 19, thereby resulting in a downward movement of the casing 18, in spite of the contrary urging of the spring 49, until the teeth 56 on the gear 53 mesh with the teeth 54 on the stop member 46. This meshing of the teeth 54 and 56 will normally occur promptly and before the secondary cord 20, hence the load 23 secured thereto, can move downwardly an appreciable distance. By appropriate adjustment, the downward movement of the load, which will cause it to be supported by the secondary reel, can be restricted to substantially less than an inch. The secondary cord is of sufficient strength that it will, under these circumstances, fully support the load 23.

The load supporting function of the secondary reel continues to act until a proper change is made in the condition which caused the abnormal downward movement of the load. Furthermore, the locking action between the gear 53 and the stop member 46 becomes self-energizing as soon as engagement therebetween occurs. That is, any frictional engagement between the teeth 54 and the teeth 56 will tend to oppose the rotation of the drum 19 in the unwinding direction which is being urged by the downward movement of the load. This opposition is transferred as a downward force through the drum shaft 28 and the casing 18 to further compress the spring 49 and thereby increase the pressure between the gear 53 and the stop member 46. Thus, the force creating the undesirable downward movement is utilized to stop such movement, and the locking action continues until the force is removed or intentionally overcome by applying an opposing force.

The sensitivity of the secondary reel to sudden downward movements can be substantially reduced for non-critical installations by increasing the strength of the spring 49 as well as the spacing between the teeth 54 and 56. Under some circumstances, it may be desirable to increase the sensitivity of assembly so that relatively slow accelerations in the movement of the load away from the reel assembly will initiate a locking action. This can be accomplished by providing the secondary drum 19 with a velocity or acceleration control, which can be adjusted to increase sharply the force required to rotate the drum 19 after it reaches a certain speed or rate of acceleration, thereby resulting in a prompt operation of the secondary reel to support the load.

Although a particular preferred embodiment of the invention has been described above in detail for illustrative purposes, it will be understood that variations or modifications of such disclosure, which lie within the scope of the appended claims, are fully contemplated.

What is claimed is:

1. An apparatus to support a load, comprising: a first casing, a first drum rotatably supported within said casing; a first cord connected to and wound upon said drum for engagement with a load; first spring means connected between said drum and said casing for urging rotation of said drum in a cord winding direction; guide means on one axial side of said first casing; a second casing having slide means thereon engageable with said guide means for movement therealong in a direction transverse of the rotational axis of the first drum; a second drum rotatably supported within said second casing for rotation around an axis perpendicular to said direction of movement; resilient means resiliently resisting movement of the second casing with respect to the first casing in said direction and toward the load; a second cord secured to and wound upon said second drum and engageable with the load; second spring means connected between said second drum and said second casing for urging rotation of said second drum in a cord winding direction, said first spring means being substantially stronger than said second spring means; the inertia of said second drum and the strength of said second spring being such that an accelerated movement of said second cord away from said second casing overcomes said resistance of said resilient means and moves said second casing with respect to said first casing in said direction; stop means on said first casing and on said second drum engageable for preventing relative rotation therebetween in response to said movement of said second casing in said direction, whereby on failure of said first cable to prevent accelerated movement of said load, further movement of said load will be stopped by the second cable.

2. The structure of claim 1 wherein said stop means includes a gear concentrically secured to said second drum on the side thereof adjacent the first casing and a toothed member secured to said first casing and extending through an opening in said second casing into radial alignment with said gear; and wherein said means resiliently resisting movement consists of a spiral spring held under compression between said toothed member and said slide means.

3. The structure of claim 1 wherein the means resiliently resisting movement of the second casing comprises a spiral spring, the relative strengths of said second spring means and of said spiral spring being such that the resistance of said spiral spring to said movement of said second casing is overcome by a sudden movement of the cord on the second drum in said direction, whereby said drum is moved with respect to said first casing in said direction so that said stop means become engaged.

4. A reel assembly providing a dual support for a load, comprising: a first reel including a casing, a spring biased rotatably supported within said casing and a cable secured to said drum and extending downwardly through a circumferential opening in said casing for connection to the load and for opposing movement of the load away from the drum; a second reel including a second casing, a second spring biased drum rotatably supported within said second casing and a cable secured to said second drum and extending downwardly through a circumferential opening in said second casing for connection to the load and for opposing movement of the load away from said second drum, said second casing being slidably supported upon said first casing for substantially vertical movement transversely of the rotational axis of the first drum substantially along a diameter thereof, the spring of the first drum being substantially stronger than the spring of the second drum; resilient means resiliently resisting downward movement of said second casing with respect to said first casing, the structure of the second spring biased drum being such that said resilient means is overcome by effecting a substantial acceleration in the downward movement of the cable on the second drum, whereby said second casing is moved downwardly with respect to the first casing; and engageable toothed means on said first casing and on said second drum, engagement between said toothed means being effected in response to said downward movement of said second casing, whereby relative rotation between said second drum and said first casing is positively prevented so that on failure of said first cable to prevent accelerated movement of said load, movement of said load will be stopped by the second cable.

5. An apparatus to support a load, comprising:
a frame;
a first drum rotatably mounted upon said frame;
first spring means for urging rotation of said first drum with respect to said frame in one rotational direction;
cable means connected to said drum and connectible to the load for opposing movement of the load away from said drum;
a drum support mounted upon said frame for movement in a direction substantially transverse of the rotational axis of the first drum;
resilient means resiliently resisting said movement of said drum support with respect to said frame in said direction;
a second drum rotatably mounted upon said drum support for rotation around an axis substantially perpendicular to said direction of movement;
second spring means for urging rotation of said second drum with respect to said drum support in one rotational direction, said first spring means being substantially stronger than said second spring means;
a second cable connected to said second drum and connectible to the load;
the drum support being arranged upon said frame so that a substantially accelerated movement of said second cable substantially in said direction of movement of said drum support in response to a corresponding movement of the load overcomes the resistance of said resilient means and effects a movement of said drum support in said direction of movement of said drum support; and
stop means on said frame and on said second drum for preventing relative rotation therebetween in response to said movement of said drum support with respect to said frame in said direction, whereby on failure of said first cable to prevent accelerated movement of said load, movement of said load will be stopped by the second cable.

6. A load supporting device, comprising:
a first frame and a first drum rotatably supported upon said first frame;
cable means connected to said drum and connectible to the load;
first power means connected between said first drum and said first frame for yieldably opposing rotation of said first drum in the direction for unwinding said cable means therefrom;
a second frame slidably supported upon said first frame for movement in a direction transverse of the rotational axis of the first drum;
a second drum rotatably supported upon said second frame for rotation around an axis substantially perpendicular to said direction of said sliding movement;
second power means connected between said second drum and said second frame for yieldably opposing rotation of said second drum in an unwinding direction, said first power means being substantially stronger than said second power means;

resilient means resiliently resisting said sliding movement of said second frame with respect to said first frame in said direction;

cord means connected to said second drum and connectible to said load whereby accelerated movement of said cord means away from said second frame substantially in said direction, in response to a corresponding movement of the load, overcomes said resilient means and effects said sliding movement of said second frame in said direction;

engaging means on said first frame and on said second drum for preventing relative rotation therebetween in response to said movement of said second frame with respect to said first frame in said direction, whereby on failure of said cable means to prevent accelerated movement of said load, movement of said load will be stopped by said cord means.

7. A load supporting device, comprising:

a first reel having a first frame, a first drum rotatably supported on said frame and first spring means urging unidirectional rotation of said first drum;

first cable means connected to said first drum and connectible to the load;

a second reel having a second frame, a second drum rotatably supported on said frame and second spring means urging unidirectional rotation of said second drum, said first spring means being substantially stronger than second spring means;

second cable means connected to said second drum and connectible to the load, whereby said load is supported by said first and second reels in static equilibrium;

means supporting said second frame upon said first frame for movement in a direction transverse of the rotational axis of the first drum;

resilient means resisting said movement of said second frame with respect to said first frame in said direction, said resilient means being overcome by a substantially accelerated movement of said second cable substantially in said direction of movement of said second frame in response to a corresponding movement of said load, whereby said second frame is moved in said direction with respect to said first frame; and stop means on said first frame and on said second drum engageable for preventing relative rotation therebetween in response to said movement of said second frame with respect to said first frame in said direction, whereby on failure of said first cable means to prevent accelerated movement of said load, movement of said load will be stopped by the second cable means.

8. An apparatus to support a load, comprising: a frame; a first drum rotatably mounted on said frame; power means connected between said first drum and said frame; a first elongated, flexible element connected to and wound upon said first drum and connectible to the load for movement therewith toward and away from said frame, said power means resisting the rotation of said drum whereby said flexible element is unwound from said drum; a drum support mounted upon said frame for movement with respect thereto in a direction having a substantial component parallel with the direction of the movement of said first element away from said frame; a second drum mounted upon said drum support for rotation around an axis substantially perpendicular to the direction of said component of movement of said drum support; a second elongated, flexible element connected to and wound upon said second drum and connectible to the load; first resilient means for urging rotation of said second drum, whereby said second element is wound upon said second drum, the strength of said power means being substantially greater than the strength of said first resilient means; second resilient means resisting said movement of said drum support with respect to said frame in the direction of said component, the relative strengths of said second resilient means and said first resilient means being such that a substantially accelerated movement of said second element in the direction of said component in response to a corresponding movement of the load overcomes the resistance of said second resilient means and effects a movement of said drum support in the direction of said component; and interengageable stop means on said frame and said second drum for preventing relative rotation therebetween in response to said movement of said drum support in the direction of said component, whereby on failure of said first element to prevent accelerated movement of said load, further movement of said load will be stopped by the second element.

9. An apparatus to support a load, comprising: a frame; a first drum rotatably mounted on said frame; power means connected between said first drum and said frame; a first elongated, flexible element connected to and wound upon said first drum and connectible to the load for movement therewith toward and away from said frame, said power means resisting the rotation of said drum whereby said flexible element is unwound from said drum; a drum support mounted upon said frame for movement with respect thereto; a second drum rotatably mounted upon said drum support; a second elongated, flexible element connected to and wound upon said second drum and connectible to the load; first resilient means resisting rotation of said second drum whereby said second element is unwound from said second drum, the strength of said power means being substantially greater than the strength of the first resilient means; first stop means connected to said frame; second stop means connected to said drum and engageable with said first stop means for preventing rotation of said second drum with respect to said drum support; second resilient means urging said second stop means away from engagement with said first stop means; the relative strengths of said first and second resilient means being such that a substantially accelerated movement of said second element away from said second drum in response to a corresponding movement of the load overcomes said second resilient means and effects interengagement of said first and second stop means, whereby on failure of said first element to prevent accelerated movement of said load, further movement of said load will be stopped by the second element.

References Cited in the file of this patent

UNITED STATES PATENTS

| 350,473 | Bien | Oct. 12, 1886 |
| 646,635 | Cabus | Apr. 3, 1900 |
| 2,370,921 | Sharpe | Mar. 6, 1945 |

UNITED STATES PATENT OFFICE
CERTIFICATE OF CORRECTION

Patent No. 3,066,885                          December 4, 1962

Rodger F. Becker

It is hereby certified that error appears in the above numbered patent requiring correction and that the said Letters Patent should read as corrected below.

Column 5, line 63, after "biased" insert -- drum --; column 6, lines 49 and 50, strike out "of movement of said drum support".

Signed and sealed this 25th day of June 1963.

(SEAL)
Attest:

ERNEST W. SWIDER
Attesting Officer

DAVID L. LADD
Commissioner of Patents